(No Model.)
W. A. JOHNSON & J. N. SMITH.
SECONDARY BATTERY.
No. 423,324. Patented Mar. 11, 1890.
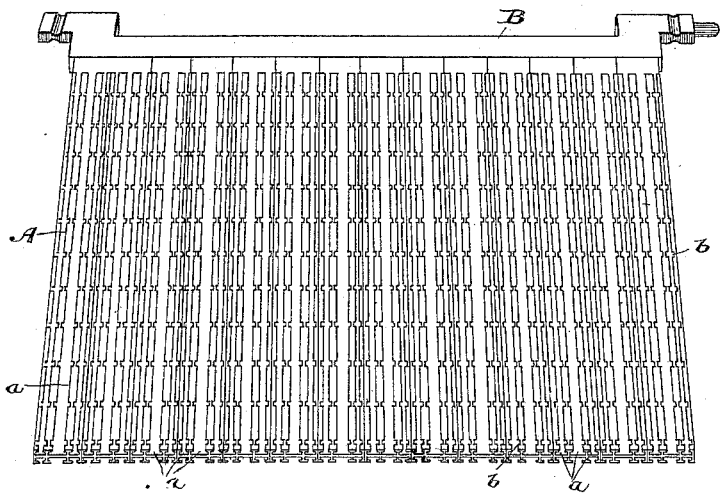
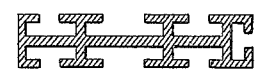
Fig. 2.
Fig. 1.
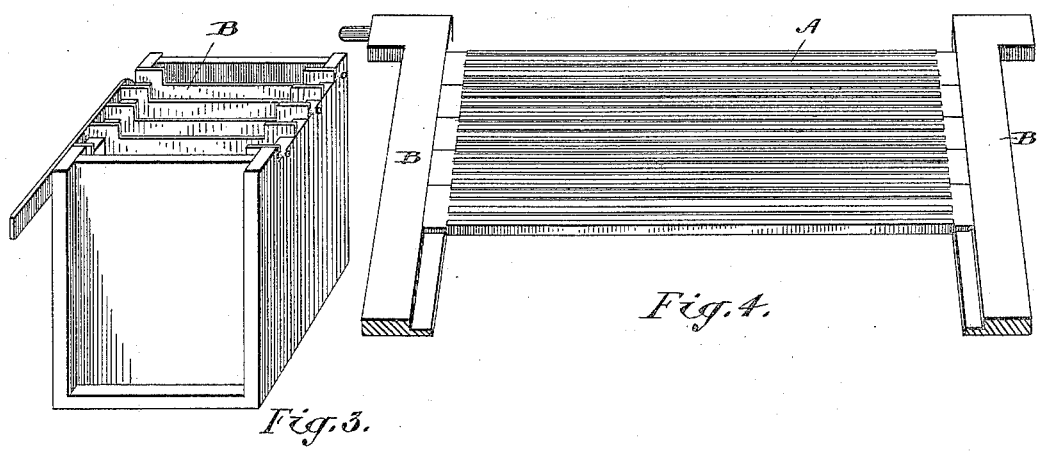
Fig. 4.
Fig. 3.
Witnesses
Inventors

UNITED STATES PATENT OFFICE.

WILLIAM A. JOHNSON AND JAMES NORMAN SMITH, OF TORONTO, ONTARIO, CANADA.

SECONDARY BATTERY.

SPECIFICATION forming part of Letters Patent No. 423,324, dated March 11, 1890.

Application filed June 27, 1889. Serial No. 315,733. (No model.)

*To all whom it may concern:*

Be it known that we, WILLIAM ASAHEL JOHNSON, electrical manufacturer, and JAMES NORMAN SMITH, electrician, both of the city of Toronto, in the county of York, in the Province of Ontario, Canada, have jointly invented a certain new and Improved Electrode for a Secondary Battery or Accumulator, of which the following is a specification.

The object of the invention is to make an electrode in which the active material may be easily and permanently fixed into the metal portion of the electrode; and it consists, essentially, of one or more plates made of lead or other suitable material, each plate having one or more longitudinal grooves into which the active material may be cast, the said electrode-plates being connected to one or more supporting-bars, each supporting-bar having terminal ends by which the electrodes in the various cells of the battery may be easily and properly connected together.

Figure 1 is a perspective view of our improved electrodes. Fig. 2 is an enlarged cross-section of one of the electrode-plates. Fig. 3 is a perspective view of a battery provided with our improved electrodes. Fig. 4 is a perspective view of a modification of our invention.

In the drawings we show the electrodes composed of a series of narrow plates made of lead or any other suitable material, and soldered or otherwise rigidly connected at each end to a metal supporting-bar B, each of the said bars being shaped, as indicated, to rest upon the top edge of the cells and support the electrode in position. It will be noticed that each plate A has a series of grooves $a$ made on each side of it, as shown, so that the cross-section of the bars appears like a series of the letter H. We consider that this is the best form of groove to make; but we do not wish to confine ourselves to the exact shape indicated. The walls of the grooves $a$, it will be observed, are contracted at their opposite edges, so that the active material cast into the grooves cannot fall out. We prefer to hold the plates A horizontally, and for that reason we provide the two bars B, as shown; but it will of course be understood that one of the bars B may be dispensed with and the remaining bar shaped so as to support the plates A vertically in their cells. When the plates A are suspended longitudinally, we burr or notch the edges of the walls of each groove, so as to prevent any possible longitudinal movement of the active material retained by the said grooves. These notches or burrs are indicated by the letter $b$.

What we claim as our invention is—

An electrode for a secondary battery or accumulator, composed of one or more plates of lead or other suitable material, each plate having a longitudinal groove or grooves made in its surface to receive and retain the active material of the electrode, the walls of each of the grooves being burred or notched, substantially as and for the purpose specified.

Toronto, June 8, 1889.

WILLIAM A. JOHNSON.
    JAMES NORMAN SMITH.

In presence of—
 CHARLES C. BALDWIN,
 W. G. McMILLAN.